US009506648B2

(12) United States Patent
Carabin et al.

(10) Patent No.: US 9,506,648 B2
(45) Date of Patent: Nov. 29, 2016

(54) STEAM PLASMA ARC HYDROLYSIS OF OZONE DEPLETING SUBSTANCES

(71) Applicant: PYROGENESIS CANADA, INC., Montreal (CA)

(72) Inventors: Pierre Carabin, Montreal (CA); Lakshminarayana Rao, Bangalore (IN)

(73) Assignee: PYROGENESIS CANADA, INC., Montreal, Quebec (CA)

( * ) Notice: Subject to any disclaimer, the term of this patent is extended or adjusted under 35 U.S.C. 154(b) by 0 days.

(21) Appl. No.: 14/629,253

(22) Filed: Feb. 23, 2015

(65) Prior Publication Data
US 2015/0338096 A1 Nov. 26, 2015

Related U.S. Application Data

(62) Division of application No. 14/269,831, filed on May 5, 2014, now Pat. No. 8,961,887, which is a division of application No. 13/424,178, filed on Mar. 19, 2012, now Pat. No. 8,716,546.

(60) Provisional application No. 61/454,368, filed on Mar. 18, 2011.

(30) Foreign Application Priority Data

Sep. 23, 2011 (CA) ..................................... 2753043

(51) Int. Cl.
| A62D 3/19 | (2007.01) |
|---|---|
| F23G 7/06 | (2006.01) |
| F23G 7/04 | (2006.01) |
| B09B 3/00 | (2006.01) |
| B01D 53/75 | (2006.01) |
| B01D 53/44 | (2006.01) |
| A62D 3/35 | (2007.01) |
| H05H 1/42 | (2006.01) |
| H05H 1/48 | (2006.01) |
| A62D 3/38 | (2007.01) |
| B01J 19/08 | (2006.01) |
| B01J 19/02 | (2006.01) |
| A62D 101/22 | (2007.01) |
| A62D 101/28 | (2007.01) |

(52) U.S. Cl.
CPC ............... *F23G 7/061* (2013.01); *A62D 3/19* (2013.01); *A62D 3/35* (2013.01); *A62D 3/38* (2013.01); *B01D 53/44* (2013.01); *B01D 53/75* (2013.01); *B01J 19/02* (2013.01); *B01J 19/08* (2013.01); *B01J 19/088* (2013.01); *B09B 3/0091* (2013.01); *F23G 7/04* (2013.01); *H05H 1/42* (2013.01); *H05H 1/48* (2013.01); *A62D 2101/22* (2013.01); *A62D 2101/28* (2013.01); *A62D 2203/02* (2013.01); *B01J 2219/00155* (2013.01); *B01J 2219/00159* (2013.01); *B01J 2219/08* (2013.01); *B01J 2219/0809* (2013.01); *B01J 2219/0811* (2013.01); *B01J 2219/0841* (2013.01); *B01J 2219/0871* (2013.01); *B01J 2219/0877* (2013.01); *B01J 2219/0894* (2013.01); *B01J 2219/0898* (2013.01); *F23G 2200/00* (2013.01); *F23G 2201/00* (2013.01); *F23G 2202/00* (2013.01); *F23G 2209/00* (2013.01); *F23G 2209/101* (2013.01); *F23G 2209/142* (2013.01); *F23G 2900/54402* (2013.01); *Y10S 588/90* (2013.01)

(58) Field of Classification Search
CPC ........................................................ A62D 3/19
USPC ................. 588/311, 410, 406, 413, 414, 900
See application file for complete search history.

(56) References Cited

U.S. PATENT DOCUMENTS

| 4,509,434 A | 4/1985 | Boday et al. |
|---|---|---|
| 4,751,056 A | 6/1988 | Hug et al. |
| 5,227,603 A | 7/1993 | Doolette et al. |
| 5,296,672 A | 3/1994 | Ramakrishnan et al. |
| 5,618,985 A | 4/1997 | Kulmala et al. |
| 5,866,753 A | 2/1999 | Deam et al. |

(Continued)

FOREIGN PATENT DOCUMENTS

| CA | 2484472 | 11/2003 |
|---|---|---|
| CN | 1652862 | 8/2005 |

(Continued)

OTHER PUBLICATIONS

European Patent Office, Supplementary European Search Report in EP-12760405.6 dated Nov. 25, 2014 (3 pages).

(Continued)

Primary Examiner — Edward Johnson
(74) Attorney, Agent, or Firm — Shutts & Bowen LLP

(57) ABSTRACT

A two step process for the destruction of a precursor material using a steam plasma in a three zone reactor wherein the precursor material is hydrolyzed as a first step in the high temperature zone of the reactor, followed by a second step of medium temperature oxidation of the reactant stream in the combustion zone of the reactor where combustion oxygen or air is injected and immediate quenching of the resulting gas stream to avoid the formation of unwanted by-products. A related apparatus includes a non transferred direct current steam plasma torch, an externally cooled three zone steam plasma reactor means for introducing the precursor material into the plasma plume of the plasma torch, means for introducing the combustion air or oxygen into the combustion zone, means for exiting the reactant mixture from the reactor and means for quenching the reactant mixture located at the exit end of the reactor.

13 Claims, 3 Drawing Sheets

(56) References Cited

U.S. PATENT DOCUMENTS

| | | | |
|---|---|---|---|
| 6,372,156 | B1 | 4/2002 | Kong et al. |
| 6,810,821 | B2 | 11/2004 | Chan |
| 8,231,851 | B2 | 7/2012 | Irie et al. |
| 8,716,546 | B2 | 5/2014 | Carabin et al. |
| 8,961,887 | B2 * | 2/2015 | Carabin ............ A62D 3/35 422/184.1 |
| 2003/0024806 | A1 | 2/2003 | Foret |
| 2003/0049190 | A1 | 3/2003 | Irie et al. |
| 2003/0171635 | A1 | 9/2003 | Bereczky et al. |

FOREIGN PATENT DOCUMENTS

| | | |
|---|---|---|
| GB | 2222600 | 3/1990 |
| JP | 02107387 | 4/1994 |
| JP | 07080286 | 3/1995 |
| JP | 8500615 | 1/1996 |
| JP | 10249161 | 9/1998 |
| JP | 2000-334294 A | 12/2000 |
| JP | 2000334294 | 12/2000 |
| WO | 9500464 | 6/1994 |
| WO | WO-03/095072 | 11/2003 |

OTHER PUBLICATIONS

Unep, "Report of the technology and economic assessment panel," vol. 3B: (Apr. 2002). (150 pages).

Yu, et al., "A review of CFC and halon treatment technologies—The nature and role of catalysts," Catalysis Surveys from Asia (Mar. 2006) 10(1): 40-54.

"International workshop on the disposal of ozone-depleting substances," Geneva International Conference Centre (Jul. 10, 2000). (73 pages).

Hassel, "Experimental investigation of PIC formation in CFC incineration," (Dec. 1, 1991). (abstract).

Search Report from the Patent Office of the People's Republic of China, dated Sep. 10, 2014. (2 pages).

"Thermal hydrolysis improves sludge digestion," The Engineer Source (Mar. 2, 2010). http:...source.theengineer.co.uk/plant-equipmwnt/energy/waste/emissions-management/slu....

International Search Report mailed on Jun. 21, 2012 in International Application No. PCT/CA20121000305. (3 pages).

\* cited by examiner

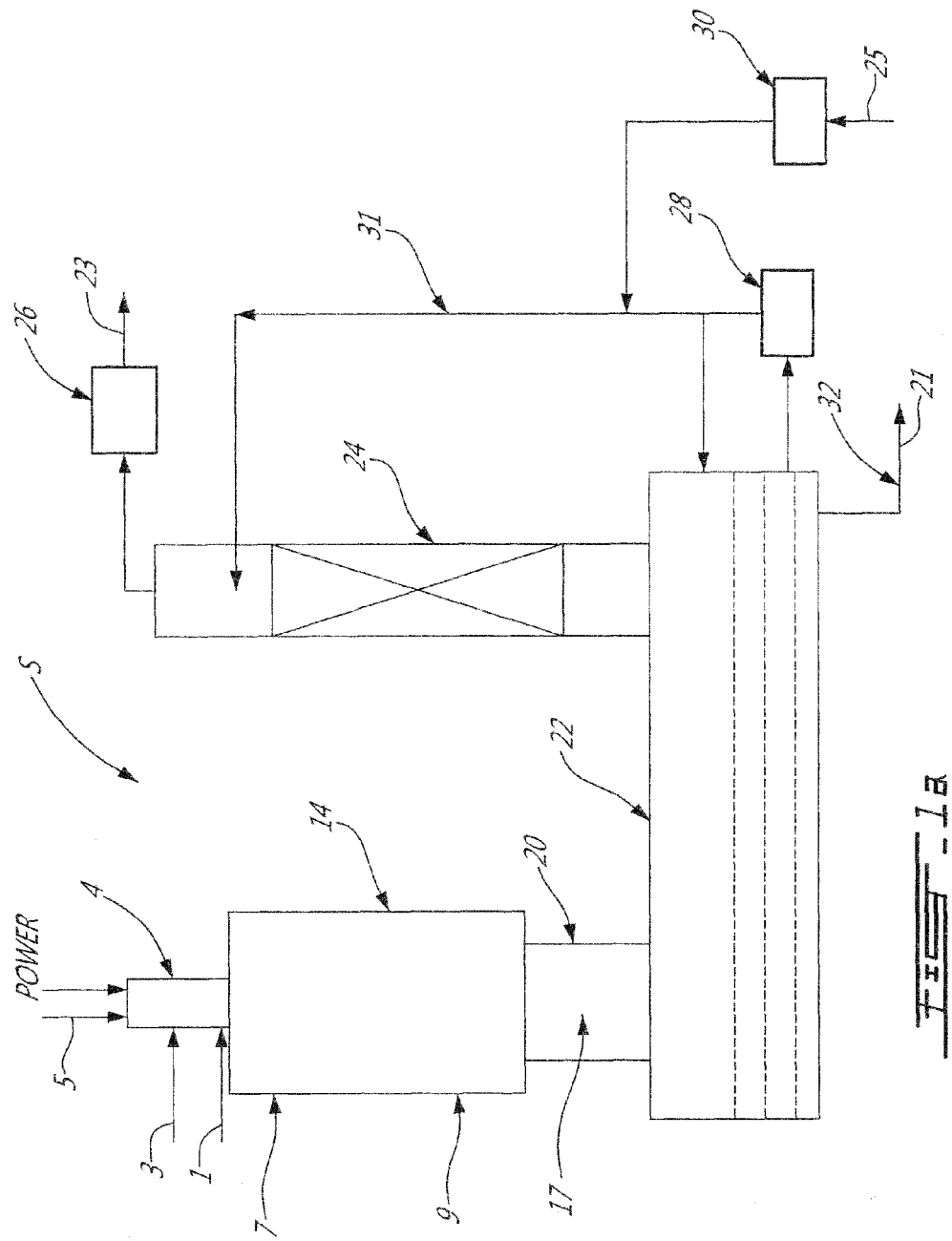

STEAM PLASMA ARC HYDROLYSIS OF OZONE DEPLETING SUBSTANCES

CROSS REFERENCE TO RELATED APPLICATIONS

This Application is a divisional of U.S. patent application Ser. No. 14/269,831, filed May 5, 2014, which is a divisional of U.S. patent application Ser. No. 13/424,178, filed on Mar. 19, 2012, and which issued as U.S. Pat. No. 8,716,546 on May 6, 2014. U.S. patent application Ser. No. 13/424,178 claimed priority to U.S. Provisional Application No. 61/454,368, filed on Mar. 18, 2011, and to Canadian Application No. 2,753,043, filed on Sep. 23, 2011.

U.S. patent application Ser. No. 14/269,831, U.S. patent application Ser. No. 13/424,178, U.S. Pat. No. 8,716,546, U.S. Provisional Application No. 61/454,368, and Canadian Application No. 2,753,043 are each incorporated by reference in their entirety.

FIELD OF THE INVENTION

The present invention relates to the depletion of the ozone in the atmosphere and, more particularly, to the destruction of ozone depleting substances.

BACKGROUND OF THE INVENTION

The Technology and Economic Assessment Panel (TEAP) of the United Nations Environmental Program (UNEP) has reviewed and approved a total of twelve technologies for the destruction of ozone depleting substances (ODS) [1]. For descriptive purposes, these approved technologies can be broadly classified as incineration technologies, plasma technologies including arc and radio frequency plasma, and other non-incineration technologies [1]. The most widely used current practice, both by ODS processing rate and by the number of processing units, for destruction of ODS is either by incineration or by argon plasma technology [1-2]. Both technologies use thermal oxidation as the main mechanism of destruction. ODS are fed into refractory lined reactors, which are heated to high temperatures in the order of 1200° C. Incinerators use fossil fuel-fired burners to achieve the necessary high temperatures, whereas argon plasma arc is used in the case of argon plasma technology [2-5].

As ODS are inherently fire inhibitors, extreme process conditions are needed for their destruction. Incinerators require large quantities of fossil fuels to achieve the high temperature necessary for ODS destruction. Ozone depleting substances are fed into the high temperature zone of the incinerators in relatively small quantities along with air or oxygen[2-5]. Often these incinerators do not have secondary combustion chambers and the off gases generated are simply diluted, before emitting to the atmosphere. Consequently, these incinerators require large quantities of fossil fuels to destroy small quantities of ODS, generate large quantities of flue gases containing significant amount of $Cl_2$, $F_2$, $NO_X$, $SO_X$, VOC, which are hard to remove from the flue gases [2-5]. Also, incineration processes pose a very high potential of emitting toxic products of incomplete combustion, such as dioxins and furans [6].

Plasma destruction technologies use argon, nitrogen or $CO_2$ as the plasma forming medium to transfer energy from an electric arc into high destruction temperatures [4, 7-10]. These technologies still use thermal oxidation as their main destruction method. Direct current plasma torches are used to heat the refractory lined reactors to high destruction temperatures. ODS, air and steam are introduced into the destruction zone and the ODS are combusted. The primary destruction mechanism in these systems is still thermal oxidation and hence has similar problems such as production of $Cl_2$, $F_2$ and $CF_4$, which are hard to remove from the flue gas. In these processes, the presence of excess oxygen and air in the high temperature zone still poses the potential formation of $NO_X$, whereas operating at diminished oxygen levels lead to formation of soot, which is hard to remove. Argon plasma technology requires high flow rates of high purity argon, which makes it expensive to use.

Therefore, there is a need in the art for an improved technology for the destruction of ozone depleting substances.

SUMMARY OF THE INVENTION

It is therefore an aim of the present invention to provide a novel system for destroying ozone depleting substances.

Therefore, in accordance with the present invention, there is provided a two step process for the destruction of a precursor material using steam plasma in a reactor, wherein the precursor material is hydrolyzed as a first step in a high temperature zone of the reactor, followed by a second step of medium temperature oxidation of the reactant stream in a combustion zone of the reactor where combustion oxygen or air is injected and immediate quenching of the resulting gas stream to avoid the formation of unwanted by-products.

Also in accordance with the present invention, there is provided an apparatus for carrying out the above process, including a non transferred direct current steam plasma torch, an externally cooled three zone steam plasma reactor including a corrosive resistant refractory lining, means for attaching the plasma torch to the reactor, means for introducing the precursor material in the form of gas vortex or fine liquid spray or solid particles into the plasma plume of the plasma torch, means for introducing the combustion air or oxygen into the combustion zone of the reactor, means for exiting the reactant mixture from the reactor and means for quenching the reactant mixture located at the exit end of the reactor.

Further in accordance with the present invention, there is provided an apparatus for the destruction of a precursor material, comprising a reactor including a high temperature zone and a combustion zone, the high temperature zone being adapted for hydrolyzing the precursor material, the combustion zone being adapted to effect medium temperature oxidation of the reactant stream where combustion oxygen or air is injected, and a quenching means is provided at an exit end of the reactor for quenching of the resulting gas stream to avoid the formation of unwanted by-products.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

Reference will now be made to the accompanying drawings, showing by way of illustration an illustrative embodiment of the present invention, and in which:

FIG. 1a is a schematic representation of a complete system for destroying ozone depleting substances in accordance with one embodiment of the present invention;

DESCRIPTION OF ILLUSTRATIVE EMBODIMENTS OF THE INVENTION

The present invention uses a steam plasma hydrolysis system S for the destruction of ODS. The main mechanism of destruction in this invention is the plasma steam hydrolysis. In this system, a custom designed steam plasma torch is used as the sole source of energy to heat the refractory lined primary reaction chamber to temperatures close to 1500° C. Superheated steam formed from regular water is used as the main plasma forming gas, along with a small quantity of inert gas. Highly reactive steam plasma, i.e. hydrogen and hydroxyl ions present in the steam plasma, are used to convert the ODS into CO, HCl and HF, in an oxygen starved environment. The produced CO is combusted downstream in the process followed by an instantaneous water quench. Oxygen starved environment eliminates the formation of toxic substances such as $Cl_2$, $F_2$ and $CF_4$ and a rapid quench eliminates the formation of dioxins and furans. The acid gases formed in the process can either (i) be neutralized with an alkali or (ii) first scrubbed with water to recover a weak acid mixture and then neutralized for the unrecoverable portion of the acid gases. In both cases, a cleaned effluent gas stream comprising mainly $CO_2$ is emitted to the atmosphere.

Now turning to the figures of the appended drawings, the present steam plasma hydrolysis system S will be described in more details.

Figure 2:
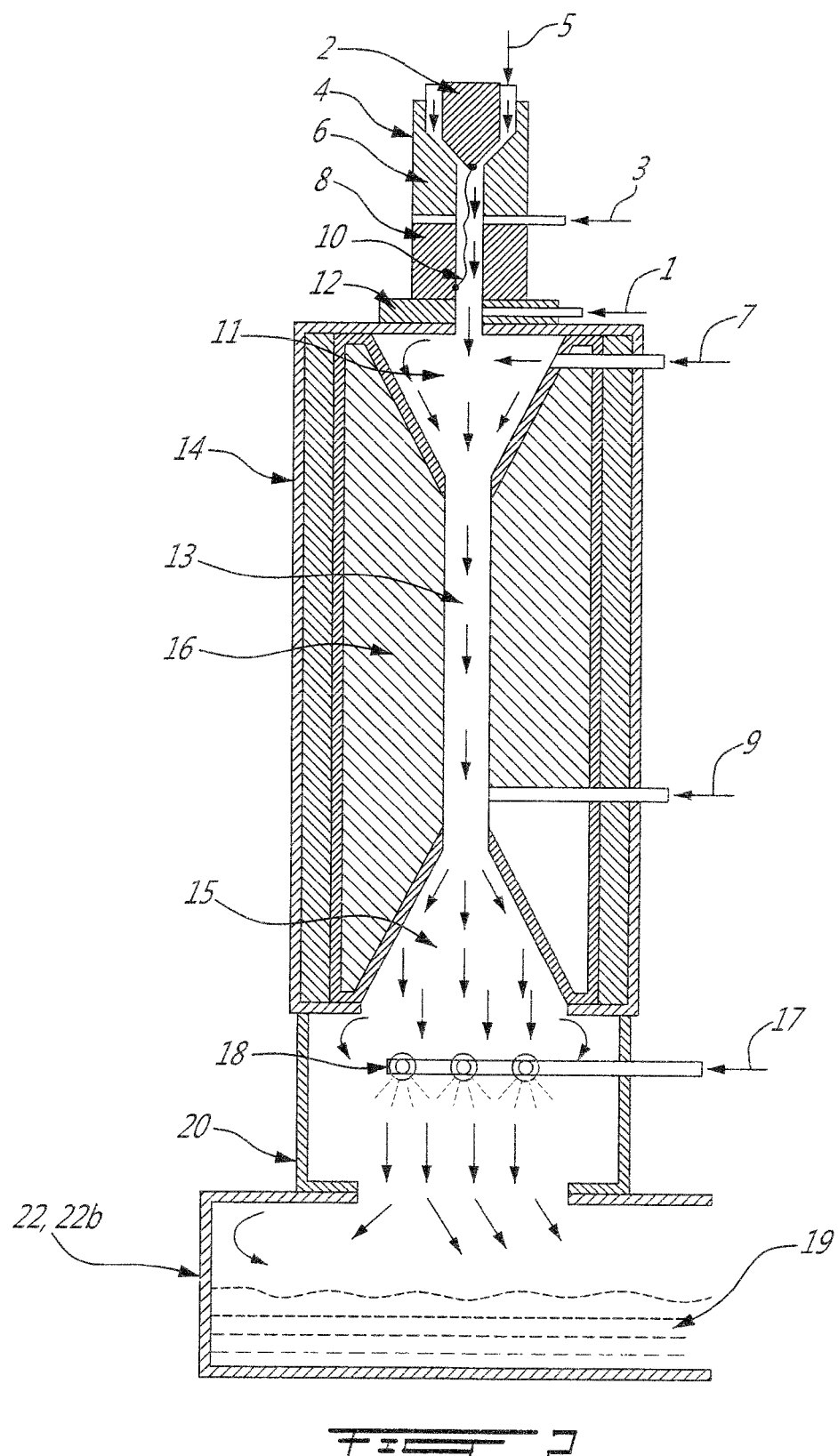
FIG. 2 is a vertical cross-sectional view of a destruction section of the present system for destroying ozone depleting substances.

A precursor material 1 is injected, either in the form of a gas vortex or a fine spray of liquid or a stream of solids, into the system S as shown in FIG. 2. The precursor material 1, to be destroyed, is fed adjacent to a plasma torch 4 via a specially designed flange 12. This flange 12 is water cooled, made of acid resisting material and is specially designed to facilitate intimate mixing of the fed precursor material 1 with the high temperature viscous steam plasma plume.

An outside heating source, typically a steam plasma torch 4, is used as the source for heating the refractory lined reactor to a temperature of 1500° C. The plasma torch 4 is designed and built with features, to avoid condensation of the superheated steam inside the torch before reaching the plasma arc. These features of the plasma torch include, (i) direct injection 3 of the main plasma forming gas, superheated steam, to the torch vortex so that it does not condense on its way to the arc plume and minimizing superheated steam passage inside the torch body; (ii) cooling of the plasma torch body with a hot fluid (propylene glycol-water mixture), circulating in a high pressure closed loop, to avoid superheated steam condensation; and (iii) use of high temperature resistant polymers such as Vespel™ or PEEK for torch internal components.

The steam plasma torch 4 includes a metallic cathode 2, a metallic ignition anode 6 and a metallic working anode 8, which are arranged as shown in FIG. 2. A plasma arc is initiated with helium or another monoatomic gas between the cathode 2 and the ignition anode 6. Once the arc is stabilized 10, a plasma forming steam is injected at 3 and the arc is transferred from the ignition anode 6 to the working anode 8. Nitrogen, helium, argon or mixture thereof is used as a shroud gas 5. The shroud gas 5 protects the metallic cathode 2 from premature oxidation and hence increases the working life of the cathode 2. Superheated steam is used as the main plasma forming gas 3.

The steam plasma torch 4, in-addition to acting as a heat source, provides reactive oxygen, hydroxyl and hydrogen ions necessary for the destruction of the precursor material 1 and prevents the formation of undesired side products, such as $Cl_2$, $F_2$, $CF_x$. The overall reaction can be summarized as:

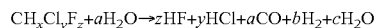

$$CH_xCl_yF_z + aH_2O \rightarrow zHF + yHCl + aCO + bH_2 + cH_2O$$

A refractory lined reactor 14 is used to destroy the precursor material 1. A corrosion resistant high durable refractory lining 16 is used as the working refractory in the reactor 14. For example, a high alumina refractory (>98% alumina content), such as Kricon 34™ or similar which is known to resist to corrosive HF and HCl gases, is used as the working refractory.

The internal walls of the reactor 14 are coated with acid resistant high temperature metallic coating such as Hastealloy™ or similar. The external walls of the reactor 14 are cooled externally, either by air or by water, for safety reasons and to limit heating of the furnace room.

The refractory lined reactor 14 comprises of three zones, as shown in FIG. 2. These three zones are:

1) a conical converging, high temperature, steam hydrolysis zone 11, wherein the fed precursor material 1 undergoes steam hydrolysis;

2) a narrow tubular zone 13, which creates high temperature turbulent mixing of the gases and facilitates completion of the hydrolysis reaction; and 3) a conical diverging, medium temperature, combustion zone 15, wherein the gases are combusted with the combustion air or oxygen.

Combustion air or oxygen 9 is added to the reactor 14, as also shown in FIG. 2. The combustion air or oxygen 9 is metered to the reactor 14 to control the temperature in the low temperature zone of the reactor 14 while achieving complete combustion and eliminating the formation of undesirable by-products such as $Cl_2$.

A water quench unit 20 is attached right at the outlet of the combustion zone 15 of the reactor 14, as seen in FIG. 2. A set of spray nozzles 18 create a fine spray of water 17 in the quench unit 20, which spray of water 17 instantaneously cools the gases. This instantaneous quenching of the gases will prevent the reformation of dioxins and furans. The quench unit 20 is built as a double-walled water-cooled pipe section with acid resisting material.

A scrubber tank 22 is attached at the bottom of the quench unit 20, as best shown in FIG. 2. The scrubber tank 22 uses acid resistant plastic sealing material on all sealing surfaces. The internal walls of the scrubber tank 22 are lined with an acid resistant Teflon™-based coating such as Halar® CCTFE, or similar. The scrubber tank 22 acts as a reservoir for collecting the quench water 19 and provides the necessary water head for a scrubber water recirculation pump 28 (see FIG. 1a).

A standard flue gas cleaning technology, i.e. either a wet off-gas cleaning technology using an acid gas neutralizing scrubber 24 (as shown in FIG. 1a) or a dry gas cleaning technology, is used to remove acid gases from the flue gas.

An induced draft fan 26 draws the off gases through the system S and creates a slightly negative pressure in the system S, as shown in FIG. 1. The entire system S is maintained under a slight negative pressure (couple of inches of H₂O column) to prevent any escape of acid gases from the system S. At the outlet of the ID fan, the off-gases are exhausted to a stack 23.

In operation, the steam plasma torch 4 heats the reactor 14 to the desired operating conditions and the precursor material 1 is injected into the plasma plume. The highly reactive hydrogen and hydroxyl ions present in the steam plasma hydrolyze the precursor material 1 in the high temperature hydrolysis zone 11. Additional steam 7 is added to the hydrolysis zone 11. The reacted stream flows through the narrow tubular zone 13, which provides the necessary turbulence and residence time for reaction to reach the combustion zone 15 of the reactor 14. The combustion air or oxygen 9 is added to the reactor 14 and the off gases exiting the reactor 14 enter the water quench 20 located at the exit of the combustion zone 15. The off gases are rapidly quenched by the fine spray of water 17 created by the spray nozzles 18. The liquid stream settles in the scrubber tank 22, whereas the off gases exit the scrubber tank 22 and pass through a standard off gas cleaning technology. Either wet scrubbing technology or dry scrubbing technology is used to clean the off gases from acid gases such as HF and HCl and to convert them to innocuous salts. The induced draft fan 26 is used to drive the off gases through the system S and create a slightly negative pressure in the system S.

Caustic soda or another alkali from a tank or drum 25 is fed to the scrubber water recirculation line 31 by a dosing pump 30 to continually adjust the pH of the scrubber solution, neutralizing any acid components (HCl, HF) from the off gases. Neutralized water 21 is removed from the scrubber tank by a blow down line 32.

Figure 1B:
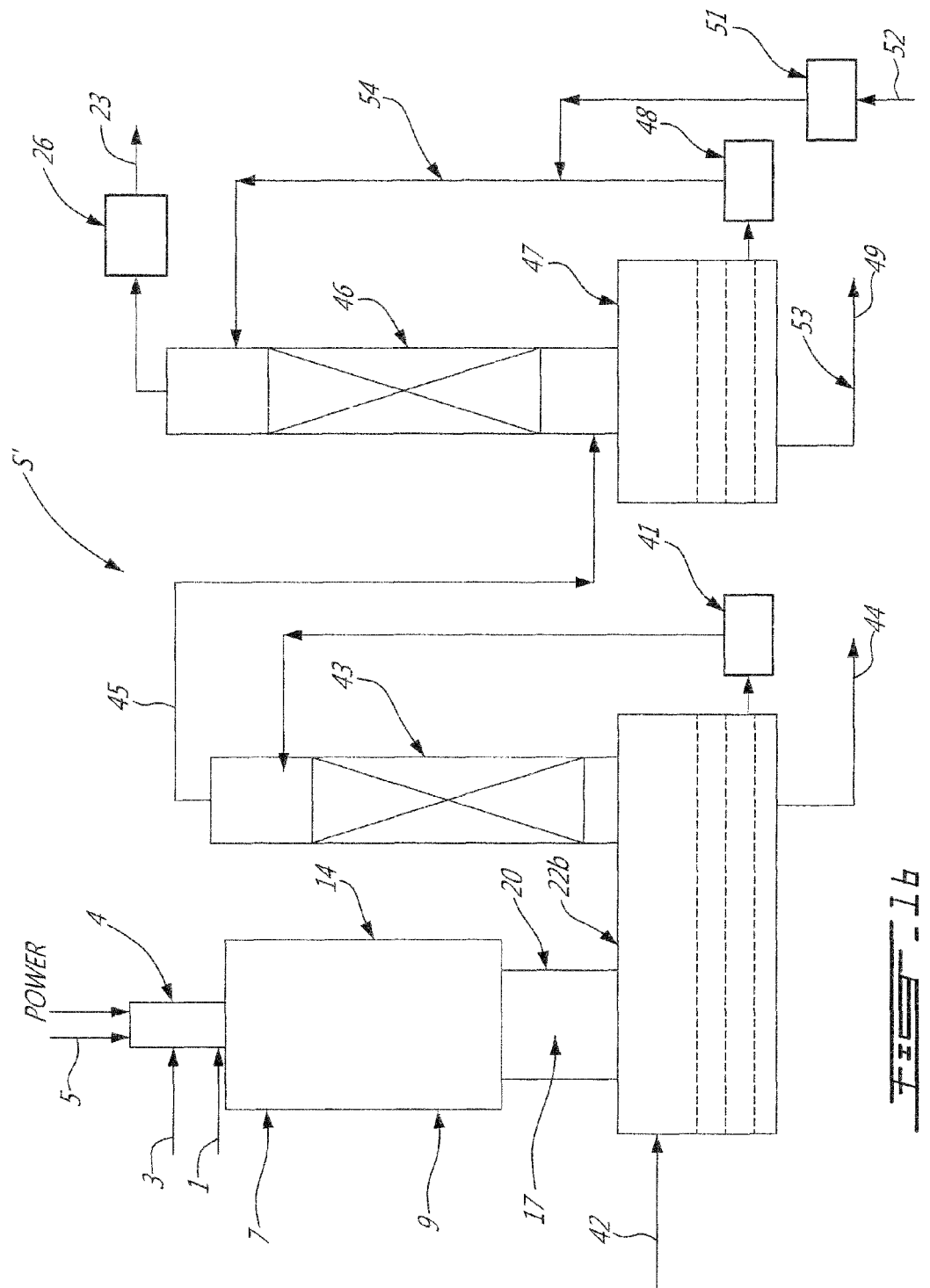
FIG. 1b is a schematic representation of a complete system for destroying ozone depleting substances in accordance with another embodiment of the present invention.

Now turning to FIG. 1b, a variant steam plasma hydrolysis system S' is described and which includes a gas cleaning option (ii) whereby a weak acid is produced followed by neutralization of the acid gases The gases leaving the quench unit 20 are sent to an acid recovery tank 22b, wherein diluted acid is used to scrub the acid gases leaving the quench unit 20. The acid recovery tank 22b is attached directly at the bottom of the quench unit 20, as best shown in FIG. 2. The acid recovery tank 22b uses acid resistant plastic sealing material on all sealing surfaces. The acid recovery tank 22b acts as a reservoir for collecting the quench water 19 and provides the necessary liquid head for a recirculation pump 41 (FIG. 1b). Fresh water 42 is added either continuously or in an on/off mode to the acid recovery tank 22b in order to control the acid concentration.

The gases travel counter current to the flow of scrubbing liquid in a packed acid scrubber unit 43. The acid gases get scrubbed as they travel through the acid scrubbing unit 43. Weak acid mixture, stream 44, which gets collected at the bottom of the acid recovery tank 22b is removed periodically from the acid scrubbing tank unit 22.

The scrubbed gas stream, stream 45, leaving the acid scrubbing unit 43 enters a gas cleaning scrubber unit 46. A scrubber tank unit 47 is attached at the bottom of the gas cleaning scrubber unit 46. The scrubber tank unit 47 uses acid resistant plastic sealing material on all sealing surfaces. The scrubber tank unit 47 acts as a reservoir for collecting the scrubbing water and provides the necessary water head for a scrubber water recirculation pump 48.

Caustic soda or another alkali from a tank or drum 52 is fed to the scrubber water recirculation line 54 by a dosing pump 51 to continually adjust the pH of the scrubber solution, neutralizing any acid components (HCl, HF) from the off gases. Neutralized water 49 is removed from the gas cleaning scrubber tank by a blow down line 53.

A standard flue gas cleaning technology, i.e. either a wet off-gas cleaning technology using the neutralizing scrubber 46 (as shown in FIG. 1b) or a dry gas cleaning technology, is used to clean the flue gas.

Although the present invention has been described hereinabove by way of embodiments thereof, it may be modified, without departing from the nature and teachings of the subject invention as described herein.

REFERENCES

1. UNEP (2002), http://www.ozone.unep.org/teap/Reports/Other_Task_Force/TEAP02V3b.pdf
2. Hai Yu, Kennedy E. M., Adesina A. A. and Dlugogorski B. Z., A review of CFC and halon treatment technologies—The nature and role of catalysts, *Catalysis Surveys from Asia*, Vol. 10, No. 1, March 2006
3. Hug et. al., Reactor for thermal cracking of hydrocarbons, U.S. Pat. No. 4,751,076, 1988
4. Bereczky et. al., Method for treatment of hazardous fluid organic waste materials, US Patent 2003/0171635 A1, 2003
5. UNEP (2000) http://www.unep.fr/ozonaction/information/mmcfiles/3521-e-file1.pdf
6. Hassel G. R., Experimental Investigation of PIC Formation in CFC Incineration, *Energy and Environ* (Res. Corp, Irvine, Calif., USA, 1991)
7. Deam et. al., Material Processing, U.S. Pat. No. 5,866,753, 1999
8. Ramakrishnan et. al., Electric arc reactor having upstream and downstream electrodes, U.S. Pat. No. 5,296,672, 1994
9. Doolette et. al., Electric arc generating device having three electrodes, U.S. Pat. No. 5,227,603, 1993
10. Shimeiwa et. al., Plasma arc decomposition method for chlorofluorocarbon equivalent material used as coolant, involves oxidizing carbon monoxide or carbon atoms generated during decomposition of carbon dioxide by oxidizing gas, Japan Patent 2000334294-A, 1999

The invention claimed is:

1. A two step process for the destruction of a precursor material using steam plasma in a reactor, wherein the precursor material is hydrolyzed as a first step in a high temperature zone of the reactor, followed by a second step of medium temperature oxidation of the reactant stream in a combustion zone of the reactor where combustion oxygen or air is injected and immediate quenching of the resulting gas stream to avoid the formation of unwanted byproducts.

2. A process according to claim 1, wherein the steam plasma is created by a non transferred direct current steam plasma torch, whereby an electric arc created between metallic electrodes and superheated steam forms a high temperature plasma plume at an exit end of the plasma torch, which is rich in reactive hydrogen and hydroxyl ions.

3. A process according to claim 2, wherein the plasma torch uses a small amount of an inert gas such as nitrogen, argon or helium or a mixture thereof as the shroud gas to protect the back electrode from excessive oxidation.

4. A process according to claim 1, wherein the precursor material is hydrolyzed at high temperatures using the reactive hydroxyl and hydrogen ions of the steam plasma plume in the high temperature zone of the reactor.

5. A process according to claim 1, wherein the gas mixture exiting the hydrolysis zone of the reactor is combusted at medium temperatures in the combustion zone of the reactor in an oxygen rich environment wherein the necessary combustion oxygen or air is injected.

6. A process according to claim 1, wherein the resulting process stream after combustion is rapidly quenched using a fine spray of cold water to avoid formation of any unwanted by-products.

7. A process according to claim 1, wherein the hydrolysis reactor includes three zones namely a conical converging, high temperature, steam hydrolysis zone which provides the necessary residence time for complete hydrolysis of the precursor material, followed by a narrow tubular zone which provides the necessary turbulence and additional residence time for the reactions and a conical diverging, medium temperature, combustion zone which provides the residence time for complete combustion of the process stream.

8. A process according to claim 1, wherein the plasma plume from the plasma torch extends into the first zone of the reactor and is contained in the reactor.

9. A process according to claim 1, wherein the precursor material is injected into the core of the steam plasma plume adjacent to the steam plasma torch and in between the plasma torch and the hydrolysis zone of the reactor, using a gas vortex creating turbulence and sufficient mixing of the precursor material with the core plasma plume.

10. A process according to claim 1, wherein, the precursor material is injected into the core either as gas or as a fine liquid spray or as fine solid particles.

11. A process according to claim 1, wherein reactive hydrogen and hydroxyl steam plasma exist in the hydrolysis zone of the reactor.

12. A process according to claim 1, wherein an oxygen starved environment exists in the hydrolysis zone of the reactor and an oxygen rich environment exists in the combustion zone of the reactor.

13. A process according to claim 1, wherein the reactant stream exiting the combustion zone of the reactor is rapidly quenched by a fine spray of cold water adjacent to the exit of the combustion zone to avoid formation of unwanted by-products.

* * * * *